US006681187B2

(12) United States Patent
Ishii et al.

(10) Patent No.: US 6,681,187 B2
(45) Date of Patent: Jan. 20, 2004

(54) COMPOSITION AMOUNT DETERMINING METHOD AND DEVICE FOR FUNCTIONAL MIXTURE

(75) Inventors: Yoshio Ishii, Kanagawa (JP); Jun Okamoto, Kanagawa (JP); Akira Ikeda, Kanagawa (JP); Yasuaki Deguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 112 days.

(21) Appl. No.: 10/118,900

(22) Filed: Apr. 10, 2002

(65) Prior Publication Data

US 2003/0023390 A1 Jan. 30, 2003

(30) Foreign Application Priority Data

Apr. 20, 2001 (JP) ....................................... 2001-123201

(51) Int. Cl.[7] ................................................ G06F 19/00

(52) U.S. Cl. ........................... 702/25; 430/30; 700/121; 702/32

(58) Field of Search .............................. 702/23, 25, 28, 702/30, 32, 84, 85, 185; 700/78, 79, 32, 108, 117, 121; 382/115, 118, 278, 309; 430/30, 331

(56) References Cited

U.S. PATENT DOCUMENTS

| | | | |
|---|---|---|---|
| 6,117,601 A | 9/2000 | Kanazawa et al. | |
| 6,421,614 B1 * | 7/2002 | Goldman et al. | 702/32 |
| 6,438,440 B1 * | 8/2002 | Hayashi | 700/121 |

* cited by examiner

*Primary Examiner*—John Barlow
*Assistant Examiner*—John Le
(74) *Attorney, Agent, or Firm*—Sughrue Mion, PLLC

(57) ABSTRACT

A device and a method for determining amounts of each of composition constituents necessary for giving a functional mixture functionality, without actual creation of the functional mixture, by varying the amounts in accordance with correlation coefficients between each of the composition constituents of previously obtained functional mixtures. The Mahalanobis distance for the amounts of N composition constituents, the Mahalanobis distance for the amounts of N-1 composition constituents from which one of the constituents is excluded, and the difference therebetween are calculated. The amount of composition constituent whose exclusion corresponds to the largest such difference is varied and the Mahalanobis distance is calculated again. Amounts of composition constituents for which the Mahalanobis distance is a minimum are selected as the amounts of the composition constituents for the functional mixture.

14 Claims, 5 Drawing Sheets

COMPOSITION AMOUNT DETERMINING METHOD AND DEVICE FOR FUNCTIONAL MIXTURE

BACKGROUND OF THE INVENTION

1. Field of the Invention

The present invention relates to a method and a device for determining composition amounts of a functional mixture, and particularly to a method and a device for determining the composition amounts of the functional mixture, which can determine composition amounts of a functional mixture composed of N components without actual preparation of the functional mixture.

2. Description of the Related Art

The following various methods have been known hitherto as methods of determining the composition amounts of a functional mixture composed of N components, in terms of composition ratios.

According to a general method, a functional mixture is actually prepared, and it is estimated for the functional mixture by some method whether or not desired functionality has been imparted to the functional mixture.

This method will be described below as it is applied to an emulsion-dispersed material, which is a kind of functional mixture.

The emulsion-dispersed material contains hydrophobic material dispersed in the form of minute oil-in-water droplets in a dispersion medium, and such is used in various fields such as photosensitive materials for photography, cosmetics, foods, chemicals, etc.

As one of the functions required of the emulsion-disperses material, it is required that the size of the minute oil-in-water droplets is prevented from increasing to a fixed value or more with the passing of time and that no over-size oil droplets are generated. The necessity of this function is disclosed in, for example, Japanese Patent Application Laid-Open (JP-A) No. 9-131519, and this publication discloses a method of estimating the functionality of the emulsion-dispersed material by directly observing over-size oil droplets. Further, JP-A No. 10-260488 discloses a method of directly estimating the number of over-size oil droplets.

Furthermore, as an example where the functionality necessary for the emulsion-dispersed material is hindered, Japanese Patent Application Publication (JP-B) No. 60-53865 discloses an observation example of deposition of a coupler (the hydrophobic material) which would have been originally dissolved in the minute oil droplets.

In order to prepare the emulsion-dispersed material such that occurrence of over-size oil droplets and deposition are prevented, it is required that the emulsion-dispersed material is actually prepared and such estimations as are carried out in the above prior art examples are carried out on the actually prepared emulsion-dispersed material to check the functionality of the emulsion-dispersed material.

Beside the above, JP-A No. 2000-89404 discloses a method of specifying solubility parameters of a hydrophobic material and a high boiling point solvent, and thus volume percentages of the hydrophobic material and the solvent that will prevent deposition of the hydrophobic material. According to this method, an emulsion-dispersed material composition which can suppress deposition can be achieved in advance.

However, in the case where many kinds of hydrophobic materials are added or the like, satisfactory prediction cannot be performed.

Further, the composition of an emulsion-dispersed material which does not deposit can be determined before preparation thereof, by applying a method for preventing the deposition of the hydrophobic material to the emulsion-dispersed material. However, it is difficult to pre-empt the occurrence of over-size oil droplets.

Beside these, JP-A No. 2000-171956 (a corresponding patent : U.S. Pat. No. 6,117,601) discloses a method of judging a treatment liquid (a kind of functional mixture) and treatment conditions for a silver halide photosensitive material, and a correction method therefor.

JP-A No. 2000-171956 discloses a method of determining a Mahalanobis distance from a group of many normal states (as expected of a functional mixture provided with functionality) to thereby judge a treatment liquid for which it is unclear whether the liquid is normal or not (i.e., it is unclear whether the liquid will have the required functionality). Further, it is disclosed that for each constituent component, the Mahalanobis distance is compared between a case where all the constituent components are contained and cases where each component is excluded, thereby detecting any constituent components that cause "non-normality".

By the above method, the constituent components to be corrected can be specified. However, a method of determining how the constituent components should be corrected must be additionally considered.

If necessary, tests and estimations must be newly carried out, and there are cases where a correction value cannot be quickly predicted.

SUMMARY OF THE INVENTION

An object of the present invention is to provide a method and a device by which the composition amounts of each of constituent components effecting functionality of a functional mixture, such as an emulsion-dispersed material or the like, are brought closer to correlation coefficients between respective constituent components of functional mixtures which have been previously achieved, before the functional mixture is actually prepared, and accordingly determining the composition amounts of the constituent components and imparting the functionality.

In order to attain the above object, according to the present invention, there is provided a functional mixture composition amount determining method for determining a composition amount of each of N constituent components when a functional mixture including the N constituent components is to be prepared, the method including the steps of: (1) determining a correlation matrix R having as elements correlation coefficients between composition amounts $c_1, c_2, c_3, \ldots, c_N$ of the N constituent components of each of M functional mixtures C, each functional mixture C being known in advance to have required functionality, and M being greater than N; (2) calculating a Mahalanobis distance $D^2$ or D for all of composition amounts $u_1, u_2, u_3, \ldots, u_N$ of the N constituent components of a functional mixture U, it being unknown whether or not the functional mixture U has the required functionality; and (3) varying the composition amount of at least one of the constituent components of the functional mixture U such that the Mahalanobis distance is reduced, and determining as a composition amount of the at least one constituent component in the functional mixture to be prepared the composition amount at which the Mahalanobis distance is reduced.

$$D^2=UR^{-1}U^T \quad (1)$$

$U^T$ represents the transposed matrix of a matrix U, the matrix U is ($u_1$, $u_2$ $u_3$, . . . , $u_N$), and each composition amount $c_k$ of each of the M functional mixtures C and each composition amount $u_k$ of the functional mixture U is transformed such that, for each of the N constituent components, the average of the composition amounts of the constituent component in the M functional mixtures C and the functional mixture U is 0 and the standard deviation of the composition amounts thereof is 1.0.

Further, in order to attain the above object, according to the present invention, there is provided a functional mixture composition amount determining device for determining a composition amount of each of N constituent components when a functional mixture including the N constituent components is to be prepared, the device including: a storage component which stores at least one of a correlation matrix R having as elements the correlation coefficients between composition amounts $c_1$, $c_2$, $c_3$, . . . , $c_N$ of the N constituent components of each of M functional mixtures C and the inverse matrix of the correlation matrix R, each functional mixture C being known in advance to have required functionality, and M being greater than N; a calculation component which calculates a Mahalanobis distance $D^2$ or D for all of composition amounts $u_1$, $u_2$, $u_3$, . . . , $u_N$ of the N constituent components of a functional mixture U, it being unknown whether or not the functional mixture U has the required functionality; and a determining component which varies the composition amount of at least one of the constituent components of the functional mixture U such that the Mahalanobis distance is reduced, and determining as a composition amount of the at least one constituent component in the functional mixture to be prepared the composition amount at which the Mahalanobis distance is reduced.

In the above invention, one in turn of each of the constituent components of the functional mixture U is excluded from the functional mixture U to achieve N sets of (N-1) composition amounts. By using the N sets of (N-1) composition amounts of remaining constituent components (i.e., the remaining constituent components achieved by excluding the one constituent component from the constituent components), the Mahalanobis distance is successively calculated for each of the N sets of (N-1) composition amounts. Thereafter, a difference between the Mahalanobis distance calculated by using the N composition amounts and the Mahalanobis distance calculated by using the (N-1) composition amounts is calculated for each set. By varying the composition amount of the constituent component whose exclusion produces the largest difference or by successively varying the composition amount of a predetermined number of the constituent components, from the constituent component whose exclusion produces the largest difference to the excluded constituent component that is the predetermined number of places down the order if the constituent components are sorted in descending order of size of the difference, composition amounts in cases where the Mahalanobis distance for the N composition amounts containing the thus varied composition amount is consequently reduced can be determined (selected) as the composition amounts of the functional mixture.

A new correlation matrix may be calculated by appending to the matrix of composition amounts of the functional mixtures C, which are previously known to have the necessary functionality, the composition amounts of the functional mixture U, which now has the functionality due to determination of the composition amounts, and this correlation matrix may then be used as the correlation matrix R.

The composition amounts can be more accurately determined if the method in which the Mahalanobis distance is reduced is replaced by a method in which the Mahalanobis distance is minimized.

In the step (1) of the present invention, M functional mixtures C which have been previously judged to have necessary functions by some method are collected, and all the correlation coefficients among N composition amounts $c_1$, $c_2$, $c_3$ . . . , $C_N$ of N types of constituent components (M>N) are calculated so as to determine the correlation matrix R having the correlation coefficients as elements.

"Functional mixture" in the present invention includes all mixtures that contain two or more kinds of constituent components and have a "function".

Here, "function" is a "requirement" for use of the mixture, and does not mean a function in the narrow sense of a positive action being required. "Requirement" includes functions in a broader sense; for example, that the mixture has no side reaction, that deterioration of the mixture is low, and the like may be referred to as functions in the present invention.

When there are two or more "requirements", the functions to be provided by the present invention may be all of these requirements or just some of the requirements.

An "emulsion-dispersed material for photosensitive materials for photography" is included in "functional mixtures" of the present invention, and the term "functional mixture" will be described in more detail by exemplifying an emulsion-dispersed material for photosensitive materials for photography.

The constituent components of an emulsion-dispersed material for a photosensitive material for photography are a functional mixture containing water, gelatin, a coupler and oil as constituent components. Requirements of the emulsion-dispersed material for a photosensitive material for photography include, for example, that oil-soluble materials such as coupler, oil, etc. are provided in the form of oil droplets in the photosensitive material and show a coloring reaction, and that neither an increase in size of the minute oil droplets nor deposition of the coupler occurs. The former is a "function" in the narrow sense, and the latter is a "requirement" that the emulsion-dispersed material shows no side reaction, and both are considered "functions" in the present invention.

The "functional mixture" in the present invention may be a liquid material such as a solid fine-particle dispersed material of an emulsified material, a solution, a pigment, etc., or a solid material such as an alloy, a polymer or the like, or a powdery mixture comprising a number of components.

The present invention is particularly effective in cases where much time and cost might be needed to estimate functionality and cases where there is no objective quantitative method for estimation of functionality (for example, the scent of a perfume, the taste of a drink, etc.).

In the present invention, the N kinds of constituent components of the functional mixture may correspond to all constituent components of the mixture or just some of the constituent components. In other words, the present invention may be applied to all of the constituent components or just some of the constituent components (but at least two of the constituent components).

The number (N) of the kinds of constituent components to be used must be at least two, and the upper limit of the number is restricted as follows. That is, when N constituent components are used, it is required that the number M of functional mixtures which are already known to have the necessary functions is larger than the number N. Preferably, M is at least twice N, and more preferably M is at least five times N.

Another restriction resides in the increase of calculation time due to increases of the numbers N and M. The calculation time is dependent on advances in the performance of computers and the like, and thus a preferable upper limit number is not necessarily determined in relation to N and M. However, the numbers N and M must be determined in consideration of the fact that as the numbers N and M increase, the calculation time is also increased. In consideration of calculations of correlation coefficients, it is preferable that M is equal to 20 or more irrespective of N.

The "correlation matrix" in the present invention is the same as generally known correlation matrices, and is achieved by calculating respective correlation coefficients of the respective constituent components and arranging the correlation coefficients as shown in the following equation (2).

$$\begin{pmatrix} r_{11} & r_{12} & r_{13} & \Lambda & r_{1N} \\ r_{21} & r_{22} & r_{23} & \Lambda & r_{2N} \\ M & M & M & & M \\ r_{N1} & r_{N2} & r_{N3} & \Lambda & r_{NN} \end{pmatrix} \quad (2)$$

For example, an element $r_{12}$ in the equation (2) represents the correlation coefficient between the constituent components $c_1$ and $c_2$, and $r_{21}$ represents the correlation coefficient between the constituent components $c_2$ and $c_1$. Of course, $r_{12}=r_{21}$. $r_{NN}$ represents the correlation coefficient between the constituent components $c_N$ and $c_N$ (the same constituent component), and thus is always equal to 1. Accordingly, the correlation matrix is a matrix which has all diagonal elements being 1 and is symmetrical with respect to the diagonal. This correlation matrix R, or an inverse matrix thereof, is stored in a storage component.

In the step (2) (or the calculation component), the Mahalanobis distance represented by the equation (1) is calculated for each of the N composition amounts $u_1, u_2, u_3, \ldots, u_N$ of the N constituent components of the functional mixture U in which it is unclear whether a function will be present or not. The Mahalanobis distance may be defined by $D^2$ or by the square root of $D^2$ (i.e., D).

In the step (3) (or the determining component), the composition amount of at least one of the constituent components of the functional mixture U is varied such that the Mahalanobis distance (D or $D^2$) is reduced, and a composition amount for which the Mahalanobis distance is reduced is determined as the composition amount of the functional mixture.

Specifically, for example, the composition amount of a certain constituent component is increased or reduced, and then calculation of the Mahalanobis distance is carried out again. At this time, if the thus-calculated Mahalanobis distance is smaller than the initially calculated Mahalanobis distance, the composition amount of the constituent component concerned will be determined as the composition amount of the functional mixture.

Here, it may be unnecessary to vary the composition amount such that the Mahalanobis distance becomes a minimum value. As long as the Mahalanobis distance is smaller than the initially calculated Mahalanobis distance, the composition value at this time may be adopted. However, from the viewpoint of accuracy, it is preferable if a composition amount that produces a minimum value is determined as the composition amount of the functional mixture.

Next, a preferable operation in step (3) (or the determining component) will be described. By using the remaining (N-1) constituent components when only one constituent component is omitted from the N constituent components of the functional mixture U, the Mahalanobis distance is calculated for each set of (N-1) composition amounts. That is, in the creation of the correlation matrix R and the calculation of the Mahalanobis distance, the same calculation as in the step (2) (or the calculation component) is carried out except that every k-th constituent component (with k ranging from 1 to N) is excluded by turn from the functional mixture, until one-by-one exclusion of each of the N constituent components is completed, and Mahalanobis distances Dk (or $Dk^2$) (i.e., each Mahalanobis distance when the k-th constituent component is excluded) is calculated (k is integers from 1 to N). This calculation is completely the same as the calculation of the Mahalanobis distance in the step (3) (or the determining component) However, the correlation matrix R used for calculating the Mahalanobis distance Dk (or $Dk^2$) for each set of the (N-1) composition amounts is an (N-1× N-1) matrix because one composition amount is excluded.

The more the Mahalanobis distance resulting when a k-th constituent component is excluded is smaller than the initial Mahalanobis distance calculated in the step (3) (or the determining component), that is, the larger the difference between the Mahalanobis distance for the N composition amounts and the Mahalanobis distance for the (N-1) composition amounts, the more the Mahalanobis distance will be reduced by varying the composition amount of the k-th constituent component (the excluded constituent component) in the functional mixture U.

Therefore, differences ΔDk (=D-Dk or $D^2$-$Dk^2$) between the Mahalanobis distance calculated for the N constituent components and the Mahalanobis distance calculated for each set of the (N-1) constituent components are calculated, and the differences thus calculated for the respective sets of the (N-1) constituent components are arranged in decreasing order (here, the number of the sets is equal to N). In the decreasing order of the differences, the composition amount of each k-th constituent component (k being from 1 to N) is varied to reduce the Mahalanobis distance. That is, the composition amount of the constituent component that produces the largest difference when excluded is varied, or each of the composition amounts of constituent components from the constituent component corresponding to the largest difference to a constituent component a predetermined number of places down the decreasing order is successively varied. Then composition amounts for which the Mahalanobis distance for the N composition amounts including the varied composition amount is reduced are determined as the composition amounts of the functional mixture.

However, instead of obtaining N Mahalanobis distances, one for each case of excluding the k-th constituent component (k being from 1 to N), comparing these Mahalanobis distances and then sorting by the sizes of the differences, it is also possible to use orthogonal arrays. The first level in a k-th column thereof is defined by calculation with the k-th constituent component, and the second level is defined by calculation without the k-th constituent component. Rankings of respective differences may then be obtained.

The main advantage of using orthogonal arrays is an increase in calculation accuracy. For each level of the constituent components allocated to the respective columns of the orthogonal arrays, at least two data repetitions (two in the case of an L4 orthogonal arrays) are input, and the average thereof is calculated to be the distance. Thus, a higher accuracy than in a case where the number of levels is 1 can be expected. As the orthogonal table becomes larger, the number of data repetitions increases correspondingly.

Further, the constituent components do not necessarily all affect the Mahalanobis distance independently. It is conceivable that the constituent components are mutually influential. However, by using orthogonal arrays, the effects of each component can be extracted.

After the composition amounts of the functional mixture U, to which functionality has been given by the determination of the composition amounts, are appended to the composition amounts of the functional mixtures C, which have been previously known to have the necessary function, a new correlation matrix may be calculated and used as the correlation matrix R as described above. With these calculations, the correlation matrix is continuously renewed, and thus more accurate composition amounts can be determined.

DETAILED DESCRIPTION OF THE PREFERRED EMBODIMENT

A preferred embodiment of a functional mixture composition amount determining device in which a functional mixture composition amount determining method according to the present invention is applied will be described in detail hereunder with reference to the accompanying drawings. In this embodiment, $D^2$ is used as the Mahalanobis distance.

Figure 1:
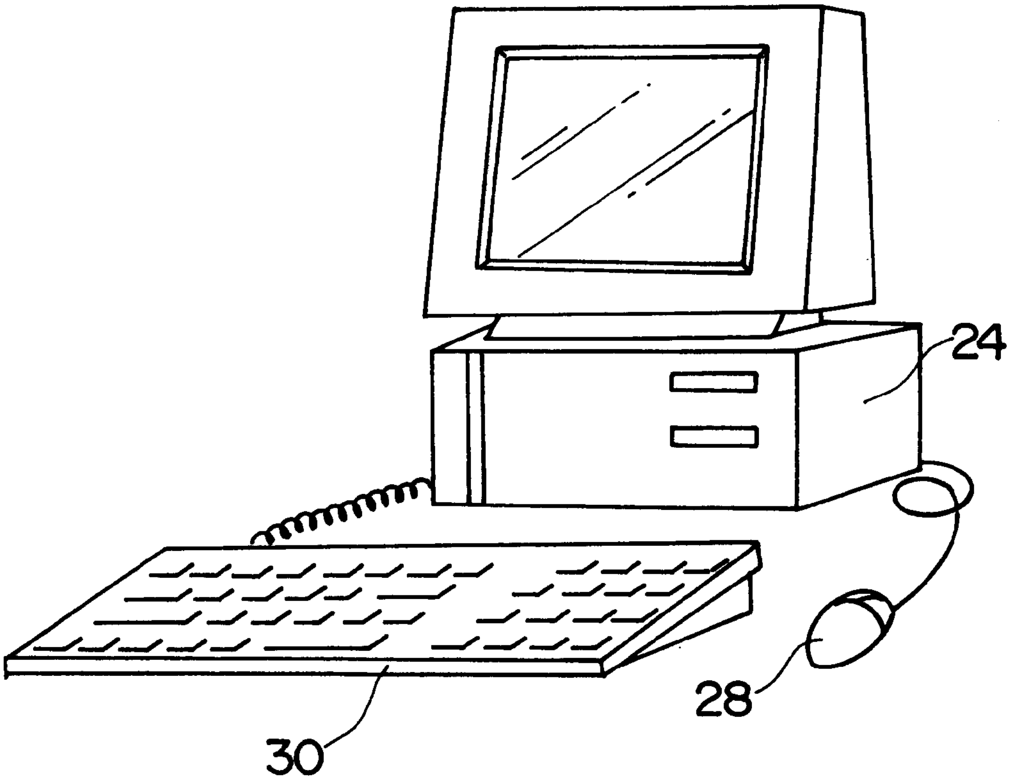
FIG. 1 is a schematic diagram showing a functional mixture composition amount determining device according to an embodiment of the present invention.
Figure 2:
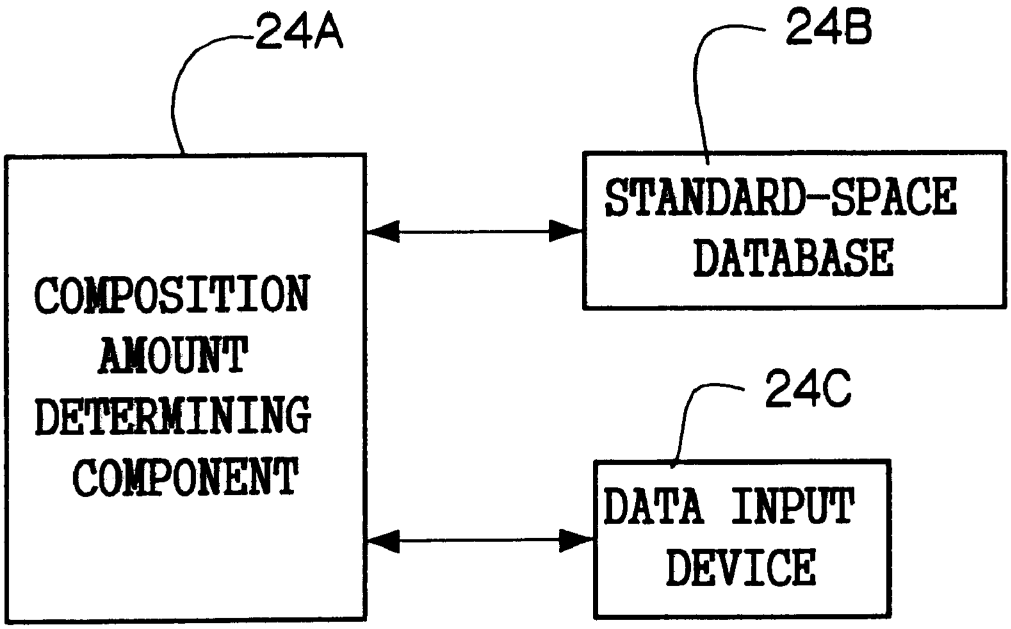
FIG. 2 is a block diagram showing a personal computer of a controller according to the embodiment of the present invention.

As shown in FIG. 1, the composition amount determining device of this embodiment is constructed to include a personal computer 24. A CRT 26 is connected to the personal computer 24. As shown in FIG. 2, the personal computer 24 contains a composition amount determining component 24A which stores a program for executing the processing routine described below, carrying out the processing of calculating the Mahalanobis distance according to the program and determining the composition amounts of the functional mixture, etc., and a standard- space database 24B with a hard disk or the like in which a standard-space database is stored. The standard-space database 24B is connected to the composition amount determining component 24A, and a data input device 24C comprising a mouse 28 and a keyboard 30 shown in FIG. 1 is connected to the composition amount determining component 24A.

Figure 3:
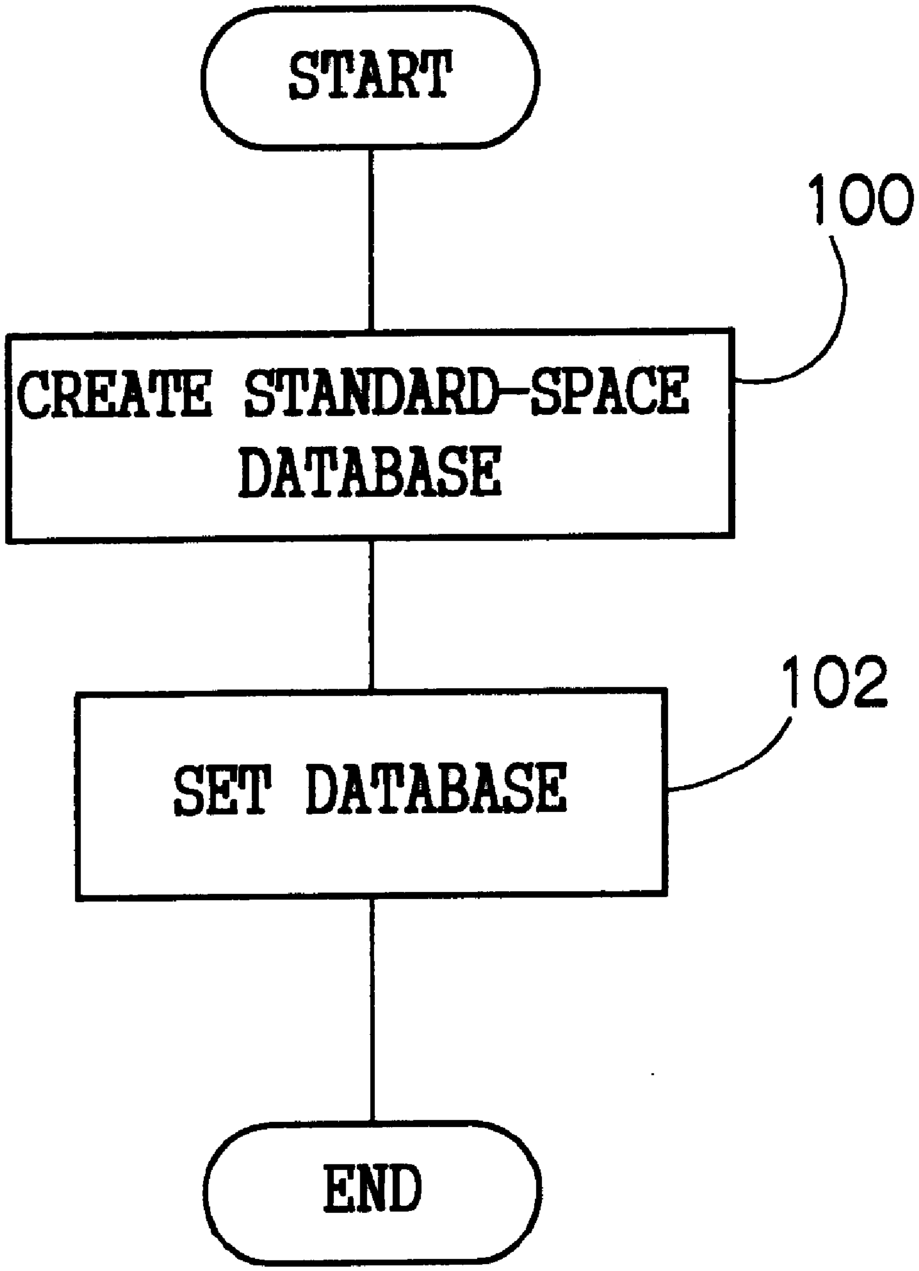
FIG. 3 is a flowchart showing a standard-space-creating routine of the embodiment of the present invention.
Figure 4A:
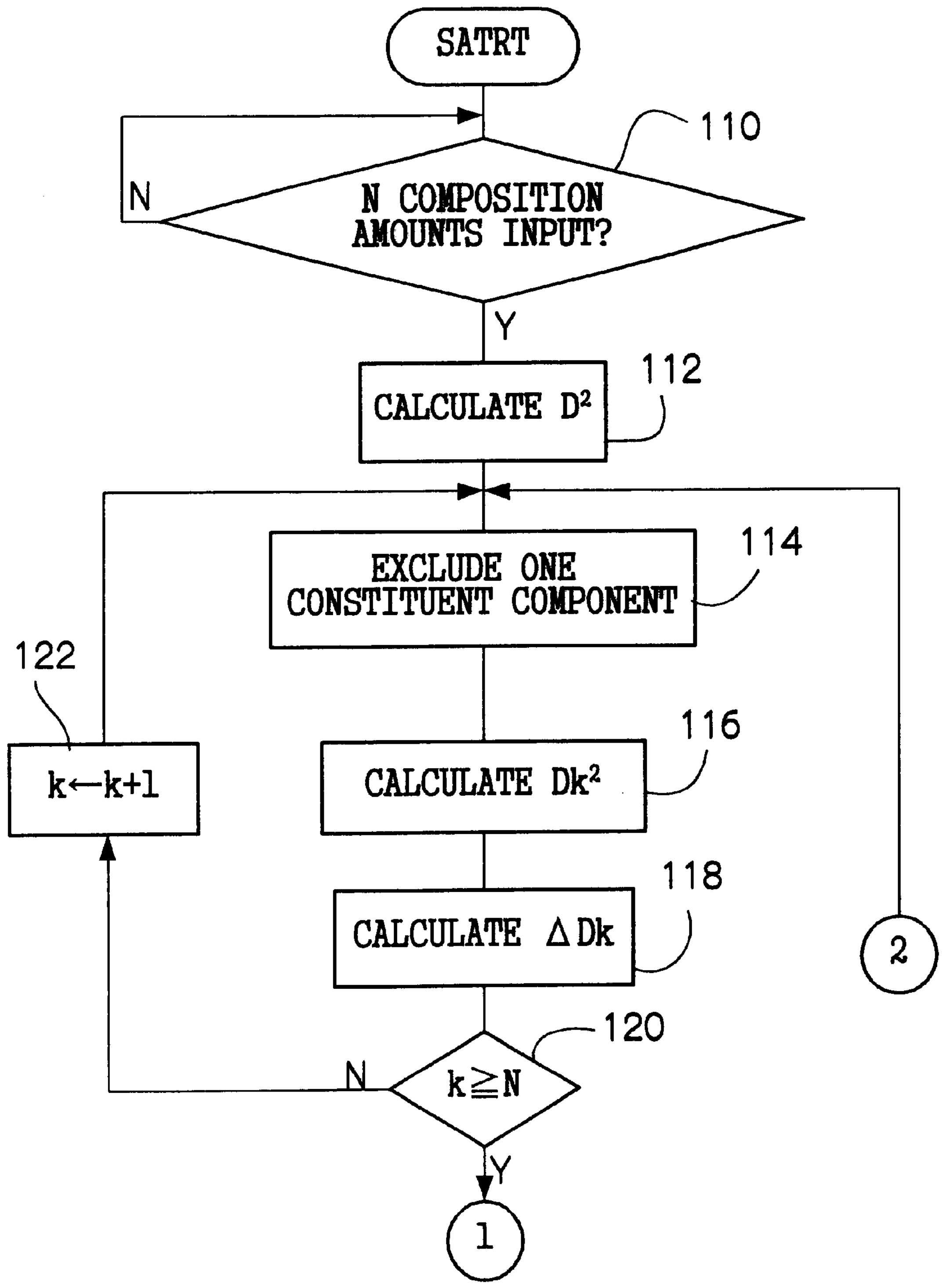
FIGS. 4A and 4B are flowcharts showing a composition amount determining routine of the embodiment of the present invention.
Figure 4B:
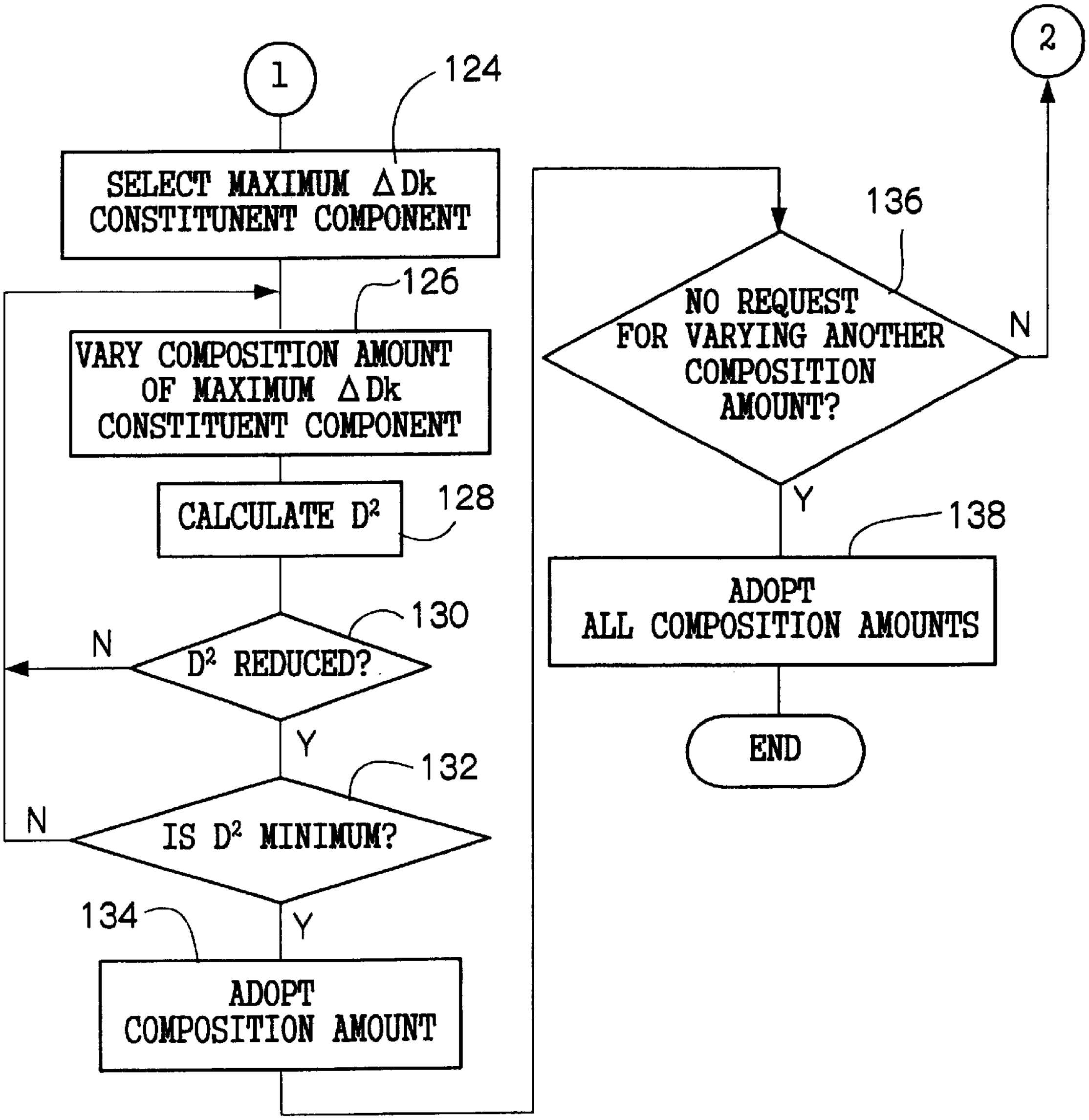

Next, a database setting process for setting a standard-space, which is executed in the composition determining component 24A in this embodiment, will be described with reference to FIG. 3, and a composition amount determination processing routine will be described with reference to FIGS. 4A and 4B.

M functional mixtures C which are already known to have necessary functions are collected, and the N composition amounts $c_1, c_2, c_3, \ldots, c_N$ of N types of constituent components of the functional mixtures (M>N) are input at the data input device 24C. In the standard-space database setting process, all correlation coefficients among the N composition amounts $c_1, c_2, c_3, \ldots, c_N$ are calculated in step 100 to calculate a correlation matrix R, and then an inverse matrix $R^{-1}$ is calculated from the correlation matrix R. Further, in step 102 the calculated inverse matrix is set as a standard-space database in the standard-space database 24B. The creation of the standard-space database can be performed by using the software MTS for Windows (product name) produced by Oken Corp.

The N composition amounts $c_i$ (i=1, 2, 3, . . . , N) are normalized as follows, and the normalized composition amounts (hereinafter referred to simply as composition amounts) $C_i$ are calculated.

$$C_i=(c_i-m_i)/\sigma_i \qquad (3)$$

Here, $m_i$ represents the average value of the composition amounts, as represented by the following equation, $\sigma_1$ represents the standard deviations of the composition amounts and $c_{ij}$ represents the i-th composition amounts of j-th functional mixtures.

$$m_i=(c_{i1}+c_{i2}+c_{i3}+\ldots+c_{iM})/M$$

$$\sigma_i^2=[(c_{i1}-m_i)^2+(c_{i2}-m_i)^2+\ldots+(c_{iM}-m_i)^2]/(M-1) \qquad (4)$$

By normalizing the composition amounts as described above, each of the composition amounts is transformed such that the average value is equal to 0 and the standard deviation is equal to 1.0.

Subsequently, the correlation matrix R having as elements (components) the correlation coefficients $r_{pq}$ between each p-th composition amount $C_p$ of the composition amounts $C_i$ and each q-th composition amount $C_q$ of the composition amounts $C_i$ is calculated (p,q=1,2,3, . . . , N), and an inverse matrix A ($=R^{-1}$) of the correlation matrix R is calculated from the correlation matrix R. The correlation matrix R and the inverse matrix A are represented as follows.

$$R=\begin{pmatrix} 1 & r_{12} & r_{13} & \Lambda & r_{1k} \\ r_{21} & 1 & r_{23} & \Lambda & r_{2k} \\ r_{31} & r_{32} & 1 & \Lambda & r_{3k} \\ M & M & M & & \\ M & r_{pq} & M & & M \\ M & M & M & & \\ r_{kl} & r_{k2} & r_{k3} & \Lambda & 1 \end{pmatrix} \qquad (5)$$

$$A=R^{-1}=\begin{pmatrix} c_{11} & c_{12} & c_{13} & \Lambda & c_{1n} \\ c_{21} & c_{22} & c_{23} & \Lambda & c_{2n} \\ M & M & M & & M \\ c_{nl} & c_{n2} & c_{n3} & \Lambda & c_{nn} \end{pmatrix} \qquad (6)$$

The elements of the inverse matrix A of the correlation matrix R are stored as the standard-space database in the standard-space database 24B.

Next, the routine of determining the composition amounts will be described with reference to FIGS. 4A and 4B.

When the normalized composition amounts of the N constituent components of the functional mixture U, in which it is unclear whether the function is provided, are input from the data input device 24C, it is determined in step 110 whether the normalized composition amounts $u_1, u_2, u_3 \ldots, u_N$ of the N constituent components have been input. When the composition amounts of the N constituent components have been input, in step 112 the Mahalanobis distance $D^2$is calculated according to the following equation by using the inverse matrix A of the correlation matrix R stored in the standard-space database.

$$D^2=UR^{-1}U^T \qquad (7)$$

Here, $U^T$ represents the transposed matrix of the matrix $U=(u_1, u_2, u_3, \ldots, u_N)$. In the above calculation, the k-th composition amount $c_k$ of each of the M functional mixtures C and the k-th composition amount $u_k$ of the functional mixture U is transformed by the normalization described above so that the average value of the M composition amounts is equal to 0 and the standard deviation thereof is equal to 1.0. That is, each of the composition amounts of the functional mixtures C and the composition amounts of the functional mixture U is transformed by the normalization described above so that the average values of M composition amounts are all 0 and the standard deviations thereof are 1.0.

In the next step 114, a single k-th constituent component is removed (initially k is 1), and in step 116 the Mahalanobis distance $Dk^2$ is calculated by using the composition amounts of the (N-1) constituent components remaining when the k-th constituent component is removed from the N constituent components. In step 118, the difference ΔDk ($=D^2-Dk^2$) between the Mahalanobis distance for N components $D^2$and the Mahalanobis distance for (N-1) components $Dk^2$ is calculated. In step 120, it is judged whether k is equal to N or more, that is, whether the calculation of the Mahalanobis distance when the composition amount of a constituent component is excluded has been completed for all the constituent components. If k is less than N, k is incremented by 1 in step 122, and from step 114 the Mahalanobis distance when the composition amount of the next constituent component is excluded is calculated in the same manner as above. Accordingly, each of the constituent components is excluded in turn, and the Mahalanobis distance $Dk^2$ is calculated by using the composition amounts of the remaining constituent components for each set of the remaining (N-1) constituent components.

In step 124, the maximum positive difference ΔDk is selected, and in step 126 the composition amount of the constituent component that brings the maximum difference when that constituent component is excluded in step 114 is varied by a predetermined amount, that is, increased or reduced by a predetermined amount. Then in step 128 the Mahalanobis distance $D^2$ is calculated for the varied one composition amount and the (N1) composition amounts which are not varied.

In the next step 130, it is judged whether the Mahalanobis distance $D^2$ has reduced or not. If the Mahalanobis distance $D^2$ has increased, the distance from the standard-space has increased and thus the composition amount is further from a combination of composition amounts of a functional mixture having the desired function. Therefore, in step 126, the Mahalanobis distance $D^2$is calculated again in the same manner as above, altering the direction of variation and again varying the composition amount by a predetermined amount.

On the other hand, if the Mahalanobis distance $D^2$ has reduced, the distance from the standard-space has decreased (i.e., it has approached the standard-space), and thus the composition amount is nearer to a combination of composition amounts of the functional mixture having the desired function. Accordingly, in step 132, it is judged whether the Mahalanobis distance $D^2$ is at a minimum. If it is not at a minimum, the processing returns to the step 126, and the Mahalanobis distance $D^2$ is calculated as described above with the composition amount further varied by a predetermined amount until it is judged that the Mahalanobis distance $D^2$ is at a minimum.

When the Mahalanobis distance $D^2$is reduced to the minimum value by variation of the constituent component whose composition amount is varied, that composition amount of the constituent component is adopted (step 134). In cases where the Mahalanobis distance $D^2$ is small or the like, a composition amount at which the Mahalanobis distance $D^2$ is merely reduced may be adopted rather than trying to find a composition amount which minimizes the Mahalanobis distance $D^2$ In the next step 136, it is judged whether there is a request for variation of another composition amount. This variation request may be input by an operator. Alternatively, the number of composition amounts to be altered may be preset in advance, and the variation request made automatically, so as to vary the composition amounts in the preset number.

If it is judged that there is a variation request of another composition amount in step 136, the processing returns to the step 114 and calculates the difference ΔDk between the Mahalanobis distances $Dk^2$ calculated by using the composition amounts of the N-1 remaining constituent components when one in turn of the constituent components is excluded from the N constituent components, in the same manner as described above, and the Mahalanobis distance $D^2$calculated in the step 128. Then the composition amount of the constituent component which brings the maximum difference ΔDk when it is excluded is varied by a predetermined amount, and a composition amount that minimizes the Mahalanobis distance D2 is determined as the composition amount of that constituent component.

The above processing is repeated until it is judged in step 136 that there is no further composition amount-varying request. When it is judged that there is no composition amount-varying request, in step 138 all the composition amounts at that time are adopted.

In the foregoing description, only the composition amount that corresponds to the largest positive difference ΔDk is varied. However, in the case of considering a group of a predetermined number of the constitution components, from the constituent component that causes the largest difference when excluded to a constituent component a predetermined number of ranks down the order if the constituent components are arranged in descending order of the differences associated with their respective exclusions, the composition amount of each of these constituent components is varied in turn, and the composition amounts when the Mahalanobis distance for the N composition amounts including a thus-varied composition amount is reduced may be determined as the composition amounts of the functional mixture.

EXAMPLES

Example 1

Example 1 relates to a method of determining composition amounts of an emulsion-dispersed material composed of gelatin and seven kinds of additives. The composition amounts of the seven kinds of additives are represented by weights thereof per unit weight of gelatin and, further, the weight of each additive is transformed so that the average is 0 and the standard deviation is 1.0. Results thereof for known compositions are shown in Table 1.

TABLE 1

| Additive 1 | Additive 2 | Additive 3 | Additive 4 | Additive 5 | Additive 6 | Additive 7 |
|---|---|---|---|---|---|---|
| 0.851045 | −1.39635 | −0.10417 | −0.27859 | 0.243455 | −0.01066 | 0.785298 |
| 0.101184 | −1.39635 | −0.75629 | 2.550451 | 1.3145 | 2.298744 | 0.654668 |
| −2.35627 | −0.94924 | −0.21148 | −1.18389 | −2.42021 | −1.91418 | 0.497931 |
| 1.202109 | −0.86838 | 3.577428 | −0.27859 | 0.243455 | −0.01066 | 0.730246 |
| 0.333687 | −0.85887 | −0.29402 | −0.27859 | −1.34638 | −1.13038 | −0.28159 |
| 0.49998 | −0.78277 | −0.02987 | −0.90098 | −0.14703 | −0.29059 | −0.88953 |
| 0.49998 | −0.78277 | −0.02987 | −0.90098 | −0.14424 | −0.29059 | −0.19239 |
| −1.67569 | −0.56397 | −0.66549 | −0.27859 | −0.6965 | −0.68949 | −0.68578 |
| 1.722546 | −0.24054 | −0.02987 | −0.90098 | −0.14424 | −0.29059 | 0.243481 |
| −0.43773 | −0.23816 | −0.75629 | 2.550451 | 1.317289 | 2.298744 | 0.641709 |
| −0.48238 | −0.212 | −0.00511 | −0.27859 | 0.926804 | 0.47921 | −3.01886 |
| −0.48238 | −0.212 | −0.40959 | −0.27859 | 0.926804 | 0.47921 | 0.312911 |
| −1.29999 | −0.12401 | −0.52516 | −0.27859 | −1.15392 | −1.01141 | −0.65731 |
| 0.088866 | −0.01461 | −0.02987 | −0.27859 | −0.14424 | −0.29059 | 0.409016 |
| 0.244381 | 0.292179 | 0.993708 | −0.27859 | −1.15392 | −1.01141 | −0.50871 |
| −0.47007 | 0.898621 | −1.15251 | −0.27859 | −1.15392 | −1.01141 | −0.50871 |
| 0.558491 | 1.126929 | 0.630502 | −0.27859 | −0.17492 | 0.47921 | −1.05506 |
| 0.575428 | 1.134064 | 1.48899 | −0.27859 | 0.926804 | 0.47921 | 0.841485 |
| 1.563951 | 1.200653 | −0.87185 | −0.27859 | 0.926804 | 0.47921 | 1.653075 |
| −1.07519 | 1.766666 | −0.40959 | 1.554627 | 0.926804 | 0.47921 | −0.46415 |
| 0.038054 | 2.220903 | −0.40959 | 0.83024 | 0.926804 | 0.47921 | 1.492271 |

The correlation coefficients among these seven kinds of additives were calculated, and the correlation matrix R was calculated. The correlation matrix R thus calculated is shown following.

Correlation matrix R

| | | | | | | |
|---|---|---|---|---|---|---|
| 1 | 0.037473 | 0.373106 | −0.11626 | 0.374289 | 0.264409 | 0.306619 |
| 0.037473 | 1 | −0.08168 | 0.148154 | 0.259485 | 0.10763 | 0.115921 |
| 0.373106 | −0.08168 | 1 | −0.24982 | 0.016717 | −0.07547 | 0.04931 |
| −0.11626 | 0.148154 | −0.24982 | 1 | 0.602635 | 0.795369 | 0.217922 |
| 0.374289 | 0.259485 | 0.016717 | 0.602635 | 1 | 0.901437 | 0.22214 |
| 0.264409 | 0.10763 | −0.07547 | 0.795369 | 0.901437 | 1 | 0.214585 |
| 0.306619 | 0.115921 | 0.04931 | 0.217922 | 0.22214 | 0.214585 | 1 |

Further, the inverse matrix $R^{-1}$ of the correlation matrix R was calculated, and the calculation result is shown following.

Inverse matrix $R^{-1}$

| | | | | | | |
|---|---|---|---|---|---|---|
| 1.986425 | −0.07928 | −0.44158 | 1.585428 | −0.11984 | −1.58343 | −0.55721 |
| −0.07928 | 1.332471 | 0.130189 | −0.72082 | −1.59099 | 1.902224 | −0.03426 |
| −0.44158 | 0.130189 | 1.238117 | 0.138053 | −0.2712 | 0.326715 | 0.019304 |
| 1.585428 | −0.72082 | 0.138053 | 5.265029 | 2.731486 | −6.83141 | −0.69759 |
| −0.11984 | −1.59099 | −0.2712 | 2.731486 | 8.620198 | −9.71991 | −0.18984 |
| −1.58343 | 1.902224 | 0.326715 | −6.83141 | −9.71991 | 15.30241 | 0.613113 |
| −0.55721 | −0.03426 | 0.019304 | −0.69759 | −0.18984 | 0.613113 | 1.236497 |

The Mahalanobis distance $D^2$ for dispersed material composition U (table 2), in which it was not known whether functionality was present, was calculated by using the inverse matrix $R^{-1}$, and the calculation result is shown in the following table 2.

TABLE 2

| Additive 1 | Additive 2 | Additive 3 | Additive 4 | Additive 5 | Additive 6 | Additive 7 |
|---|---|---|---|---|---|---|
| −5.6 | −0.64 | 5.4 | 16.4 | 0.86 | 4.5 | 4.0 |

(Values are normalized so that average = 0, standard deviation = 1.0)

The calculation result of the Mahalanobis distance $D^2$ for this mixture was as follows.

$$D^2=UR^{-1}U^T=94.2$$

Next, the addition quantity of an additive was varied so that the Mahalanobis distance $D^2$ was reduced. It was determined, by predictions of physical property values of the additives and by repetitive trial calculations, which additives should be added and how much of the additives should be added.

For example, when the composition amount of the additive 4 was set to 11.9, then $D^2$=48.1, and the Mahalanobis distance was reduced. Therefore, the composition amount of the additive 4 could be determined as 11.9.

Example 2

This Example relates to a specific example of selecting types of additives effective to reduce the Mahalanobis distance $D^2$ on the basis of the calculations.

The additives 1, 2, . . . , 7 were successively excluded one by one, and the seven values of the Mahalanobis distance $Dk^2$ (=D1 to D7) were calculated in the same manner as the calculation of the Mahalanobis distance $D^2$ for the composition amounts of Table 2 of Example 1. The calculation results are shown following.

Next, the calculation results of the difference Δk are shown.

| |
|---|
| $\Delta1 = D^2 - D1 = 94.2 - 99.0 = -4.8$ |
| $\Delta2 = D^2 - D2 = 94.2 - 107.4 = -13.2$ |
| $\Delta3 = D^2 - D3 = 94.2 - 88.5 = +5.7$ |
| $\Delta4 = D^2 - D4 = 94.2 - 38.3 = +55.9$ |
| $\Delta5 = D^2 - D5 = 94.2 - 108.7 = -14.5$ |
| $\Delta6 = D^2 - D6 = 94.2 - 92.6 = +1.6$ |
| $\Delta7 = D^2 - D7 = 94.2 - 109.9 = -15.7$ |

From the above results, the types of the additives which would reduce the Mahalanobis distance $D^2$by exclusion thereof were the additive 4 (Δ4=55.9), the additive 3 (Δ3=5.7), and the additive 6 (Δ6=1.6), in decreasing order of Δk.

From this result, it was apparent that variation of the amount of the additive 4 would be effective to reduce the Mahalanobis distance $D^2$.

The amount of the additive 4 was varied as follows and the Mahalanobis distance $D^2$ was calculated for the respective amounts of the additive 4. The results are shown in the following table.

TABLE 3

| Amount of additive 4 | $D^2$ |
|---|---|
| 16.40 (initial value) | 94.2 |
| 11.87 | 48.1 |

TABLE 3-continued

| Amount of additive 4 | $D^2$ |
|---|---|
| 7.35 | 32.8 |
| 2.83 | 48.3 |
| −2.83 | 111.1 |
| 20.93 | 171.2 |
| 26.58 | 310.7 |

From these results, the Mahalanobis distance $D^2$could be minimized by setting the amount of the additive 4 to 7.35.

According to the above-described method, the variation of the additive 4 and the amount of the additive 4 to be added could be determined by calculation rather than trial and error.

In the above embodiments, $D^2$ is used as the Mahalanobis distance. However, the composition amounts can be determined in the same manner if D is used in place of $D^2$.

As described above, according to the present invention, composition amounts of respective constituent components to bring about functionality of a functional mixture such as an emulsion-dispersed material or the like can be determined without actually preparing the functional mixture.

What is claimed is:

1. A method for determining a composition amount of each of N constituent components when a functional mixture including the N constituent components is to be prepared, the method comprising the steps of:

(1) determining a correlation matrix R having as elements correlation coefficients between composition amounts $c_1, c_2, c_3, \ldots, c_N$ of the N constituent components of each of M functional mixtures C, each functional mixture C being known in advance to have required functionality, and M being greater than N;

(2) calculating a Mahalanobis distance $D^2$ or D for all of composition amounts $u_1, u_2, u_3, \ldots, u_N$ of the N constituent components of a functional mixture U, it being unknown whether or not the functional mixture U has the required functionality; and (3) varying the composition amount of at least one of the constituent components of the functional mixture U such that the Mahalanobis distance is reduced, and determining as a composition amount of the at least one constituent component in the functional mixture to be prepared the composition amount at which the Mahalanobis distance is reduced, wherein $D^2=UR^{-1}U^T$, $U^T$ representing the transposed matrix of a matrix U, the matrix U being $(u_1, u_2, u_3, \ldots, u_N)$, and each composition amount $c_k$ of each of the M functional mixtures C and each composition amount $u_k$ of the functional mixture U being transformed such that, for each of the N constituent components, the average of the composition amounts of the constituent component in the M functional mixtures C and the functional mixture U is 0 and the standard deviation thereof is 1.0.

2. The method of claim 1, further comprising the steps of:

calculating, for each one of the constituent components of the functional mixture U in turn, the Mahalanobis distance for a set of (N-1) composition amounts, which set includes the composition amounts of remaining constituent components when the one constituent component is excluded;

calculating differences between the Mahalanobis distance for the N composition amounts and the Mahalanobis distance for each set of the (N-1) composition amounts;

varying either the composition amount of the constituent component whose exclusion produces the largest of the differences or, successively, the composition amount of each of the constituent components in descending order of the differences, from said constituent component whose exclusion produces the largest difference to a constituent component whose exclusion produces the difference that is a predetermined number of places down said order; and if the Mahalanobis distance for the N composition amounts including the composition amount varied in the step of varying is reduced, determining the varied composition amount as the composition amount of the functional mixture to be prepared.

3. The method of claim 1, further comprising the steps of:

after determining the composition amounts of the functional mixture U such that the functional mixture U has the required functionality, calculating a new correlation matrix by appending the composition amounts of the functional mixture U to the composition amounts of the functional mixtures C which are known in advance to have the required functionality; and using the new correlation matrix as the correlation matrix R.

4. The method of claim 1, wherein, when the Mahalanobis distance is reduced, the Mahalanobis distance is reduced substantially to a minimum.

5. The method of claim 1, wherein M is at least twice N.

6. The method of claim 1, wherein M is at least five times N.

7. The method of claim 1, wherein M is at least 20.

8. A device for determining a composition amount of each of N constituent components when a functional mixture including the N constituent components is to be prepared, the device comprising:

a storage component which stores at least one of a correlation matrix R having as elements the correlation coefficients between composition amounts $c_1$, $c_2$, $c_3$. . . , $c_N$ of the N constituent components of each of M functional mixtures C and the inverse matrix of the correlation matrix R, each functional mixture C being known in advance to have required functionality, and M being greater than N;

a calculation component which calculates a Mahalanobis distance $D^2$ or D for all of composition amounts $u_1$, $u_2$, $u_3$, . . . , $u_N$ of the N constituent components of a functional mixture U, it being unknown whether or not the functional mixture U has the required functionality; and a determining component which varies the composition amount of at least one of the constituent components of the functional mixture U such that the Mahalanobis distance is reduced, and determining as a composition amount of the at least one constituent component in the functional mixture to be prepared the composition amount at which the Mahalanobis distance is reduced, wherein $D^2=UR^{-1}U^T$, $U^T$ representing the transposed matrix of a matrix U, the matrix U being ($u_1$, $u_2$, $u_3$, . . . , $u_N$), and each composition amount $c_k$ of each of the M functional mixtures C and each composition amount $u_k$ of the functional mixture U being transformed such that, for each of the N constituent components, the average of the composition amounts of the constituent component in the M functional mixtures C and the functional mixture U is 0 and the standard deviation thereof is 1.0.

9. The device of claim 8, wherein said calculation component calculates, for each one of the constituent components of the functional mixture U in turn, the Mahalanobis distance for a set of (N-1) composition amounts, which set includes the composition amounts of remaining constituent components when the one constituent component is excluded, and calculates differences between the Mahalanobis distance for the N composition amounts and the Mahalanobis distance for each set of the (N-1) composition amounts, and said determining component varies either the composition amount of the constituent component whose exclusion produces the largest of the differences or, successively, the composition amount of each of the constituent components in descending order of the differences, from said constituent component whose exclusion produces the largest difference to a constituent component whose exclusion produces the difference that is a predetermined number of places down said order, and, if the Mahalanobis distance for the N composition amounts including the composition amount varied in the step of varying is reduced, determines the varied composition amount as the composition amount of the functional mixture to be prepared.

10. The device of claim 8, wherein, after the composition amounts of the functional mixture U are determined such that the functional mixture U has the required functionality, said calculation component calculates a new correlation matrix by appending the composition amounts of the functional mixture U to the composition amounts of the functional mixtures C which are known in advance to have the required functionality, and uses the new correlation matrix as the correlation matrix R.

11. The device of claim 8, wherein, when the Mahalanobis distance is reduced, the Mahalanobis distance is reduced substantially to a minimum.

12. The device of claim 8, wherein M is at least twice N.

13. The device of claim 8, wherein M is at least five times N.

14. The device of claim 8, wherein M is at least 20.

* * * * *